United States Patent [19]

McCarthy et al.

[11] Patent Number: 4,963,035

[45] Date of Patent: Oct. 16, 1990

[54] FISH SORTING MACHINE

[75] Inventors: Kevin McCarthy; Patrick DeBourke, both of St. John's, Canada

[73] Assignee: Grove Telecommunications Ltd., Newfoundland, Canada

[21] Appl. No.: 213,163

[22] Filed: Jun. 29, 1988

[30] Foreign Application Priority Data

Feb. 29, 1988 [CA] Canada .................. 560139

[51] Int. Cl.$^5$ ............................................. G60K 9/00
[52] U.S. Cl. ............................................. 382/28; 382/8; 382/1; 364/560; 356/383; 358/107
[58] Field of Search ................. 382/8, 28, 1, 6, 54; 364/562, 560; 356/383; 358/107

[56] References Cited

U.S. PATENT DOCUMENTS

| | | | |
|---|---|---|---|
| 2,447,024 | 8/1948 | Metcalf | 382/28 |
| 4,079,416 | 3/1978 | Faani et al. | 358/107 |
| 4,281,767 | 8/1981 | Carpenter | 209/703 |
| 4,601,083 | 7/1986 | Shoji et al. | 17/54 |
| 4,628,469 | 12/1986 | White | 364/560 |
| 4,665,551 | 5/1987 | Sternberg et al. | 382/54 |
| 4,687,107 | 8/1987 | Brown et al. | 382/28 |
| 4,693,378 | 9/1987 | Azegami et al. | 382/28 |
| 4,780,907 | 10/1988 | Spieser et al. | 382/6 |

Primary Examiner—David K. Moore
Assistant Examiner—Yon Jung
Attorney, Agent, or Firm—Pascal & Associates

[57] ABSTRACT

A method and apparatus for sorting fish comprising receiving the image of a fish in a video camera and storing it in an image plane memory. The boundary values of the image are determined, as well as the areas, length and width of the image. Ratios of predetermined ones of the areas, length and/or width, are determined, and the specie of the fish is indicated from predetermined ratios of those areas.

18 Claims, 9 Drawing Sheets

FISH SORTING MACHINE

This invention relates to a fish processing system and in particular to a novel fish classification method and system.

Fish processing plants traditionally have sorted fish by the use of a human operator to determine various characteristics of fish, for example the size, weight, sex, specie of fish, etc. The fish are typically sorted into various chutes for collection by group and later processing. In recent years automatic means have been designed for classifying the fish whereby they can be sorted. For example in Canadian Patent No. 1,039,235 it is desired to determine whether a fish is a female carrying eggs. Means is provided for automatically determining the transparency or translucency of the more light transparent female fish carrying eggs, and on the basis of this determination, those fish are routed along an unique chute. In that patent it is important to orient the fish head forward, and an apparatus described therein performs the orienting function.

Other apparatus for processing fish is described in U.S. Pat. No. 4,399,588 issued Aug. 23, 1983 to Robert Molnar. Patents dealing with automatic determination of the characteristics of certain items are described in Canadian Patent No. 1,110,996 and U.S. Pat. Nos. 4,687,107, 4,630,225, 4,324,335, and 4,351,437.

None of the above patents have the ability to determine the specie of the fish being considered. Further, none have the ability of processing several rows of fish at the same time. In addition, none can determine whether the fish is head first or tail first, estimate the weight of the fish, etc.

In prior art systems where the length of an object is to be determined, the front to back length is determined. However where fish are concerned, it is possible that the fish is curved, and that the front to back distance does not represent with any accuracy the length of the fish. Accordingly if a weight determination is to be made based on the measured front to rear length, it will be inaccurate, especially since the area is unknown, and the specie, which can have a different weight per unit volume are from the other.

The present invention is a means which provides a specie indication of the fish. It also provides means for providing the true length of the fish, whether the fish is oriented tail first or head first on a conveyor. Further, the invention includes means for providing the above where there are multiple rows of fish coming along a conveyor belt at the same time, using only a single camera.

Once an indication has been made as to the specie, size, various aspect ratios of the fish, they can be separated by means of pneumatically operated doors disposed across the conveyor belt. The operation of the doors is not the subject of the present invention.

In accordance with one aspect of the invention, a method for sorting fish is comprised of establishing the digital values of the bit plane pixel positions at the edges of the image of a fish stored on a bit plane, along lines across the fish, determining the midpoints between the values, and summing the distances between the midpoints, to obtain a digital value signal representative of the length of the fish.

In accordance with another aspect of the invention, a method for sorting fish is comprised of the further steps of determining the midpoint of the summed distance, establishing the sum of the distance between the bit plane pixel positions at the edge of the image to the left of the midpoint of the summed distances between the midpoint to obtain a left area signal, establishing the sum of the distance between the bit plane pixel positions at the edge of the image to the right of the midpoint of the summed distances between the midpoints to obtain a right area signal, comparing the left area signal with the right area signal and providing a signal indicative of the fish being positioned tail to the right in the event the left area signal is equal to or smaller than the right area signal.

In accordance with a further aspect, the invention is comprised of means for receiving the image of a fish in a video camera, means for receiving the image from the camera and for storing it in an image plane memory, means for determining boundary values of the image, means for determining predetermined areas, length and width of the image, means for determining ratios of predetermined ones of the areas, length and/or width, and means for indicating the specie of the fish from predetermined ratios of the areas.

In accordance with another aspect, the invention is comprised of means for receiving the image of a fish in a video camera, means for receiving the image from the camera and for storing it in an image plane memory, means for determining stored values of the width of the fish along lines perpendicular to the principal axis of the fish, and stored values of the position of the first and last one of the lines along the principal axis which intersect the image, means for determining the positions of the midpoints between the determined width boundary values, and for determining the length of lines joining the midpoints, means for summing the length of the lines to determine the length of the fish.

A better understanding of the invention will be better understood by reference to the detailed description below, in conjunction with the following drawings, in which.

Figure 3:
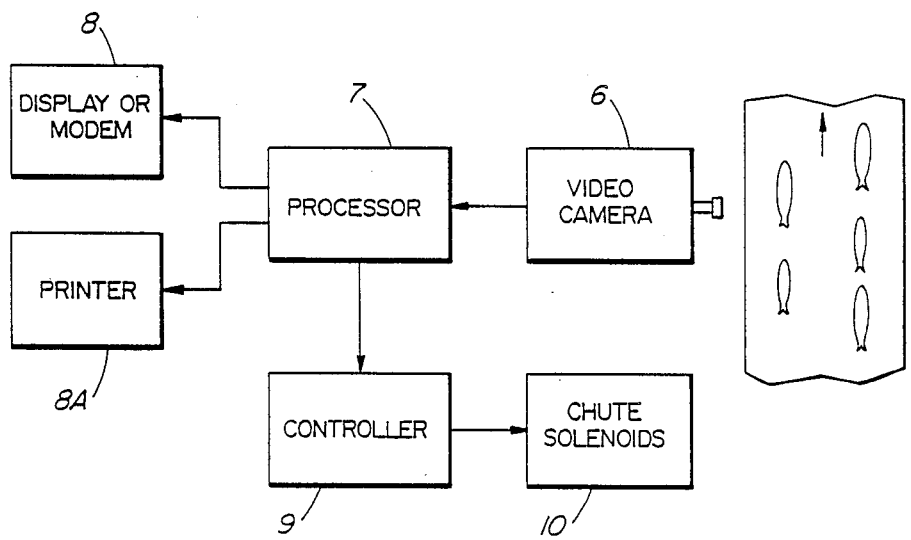
FIG. 3 is a block diagram of the present invention.
Figure 4:
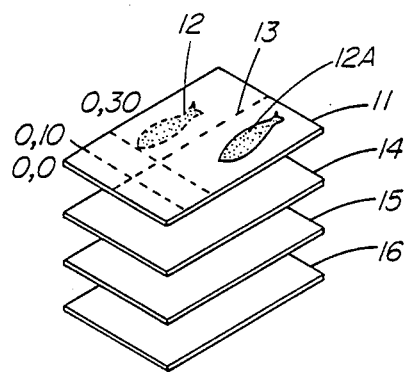
Figure 5:
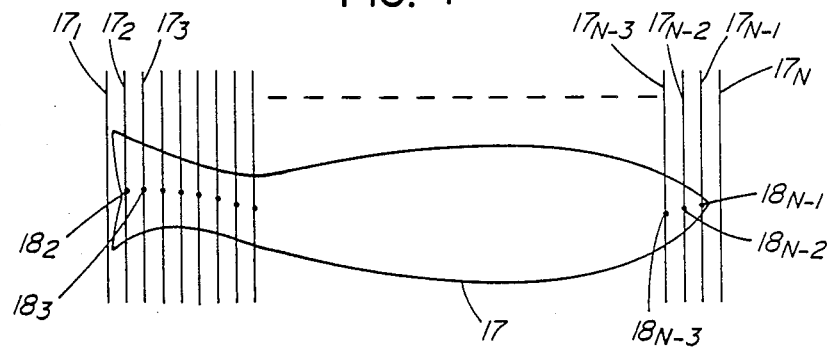
Figure 6:
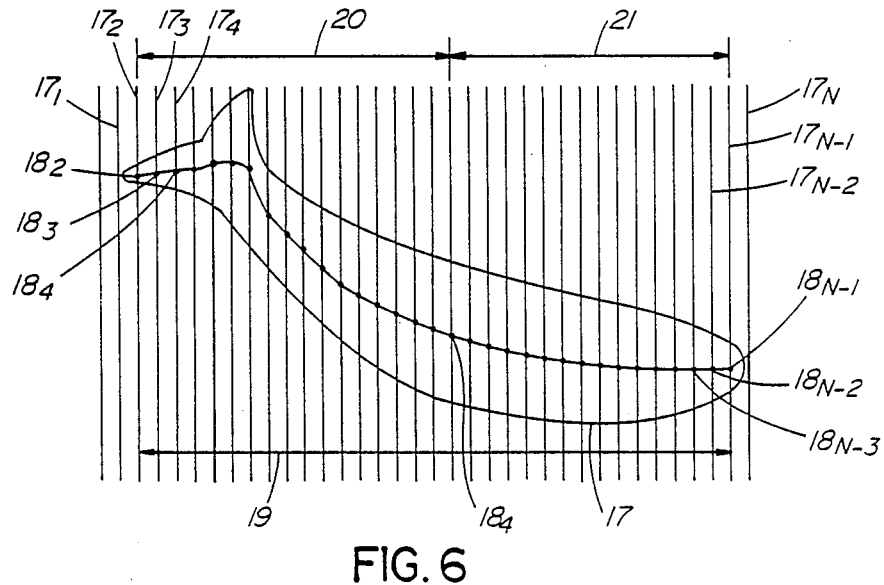
Figure 7A:
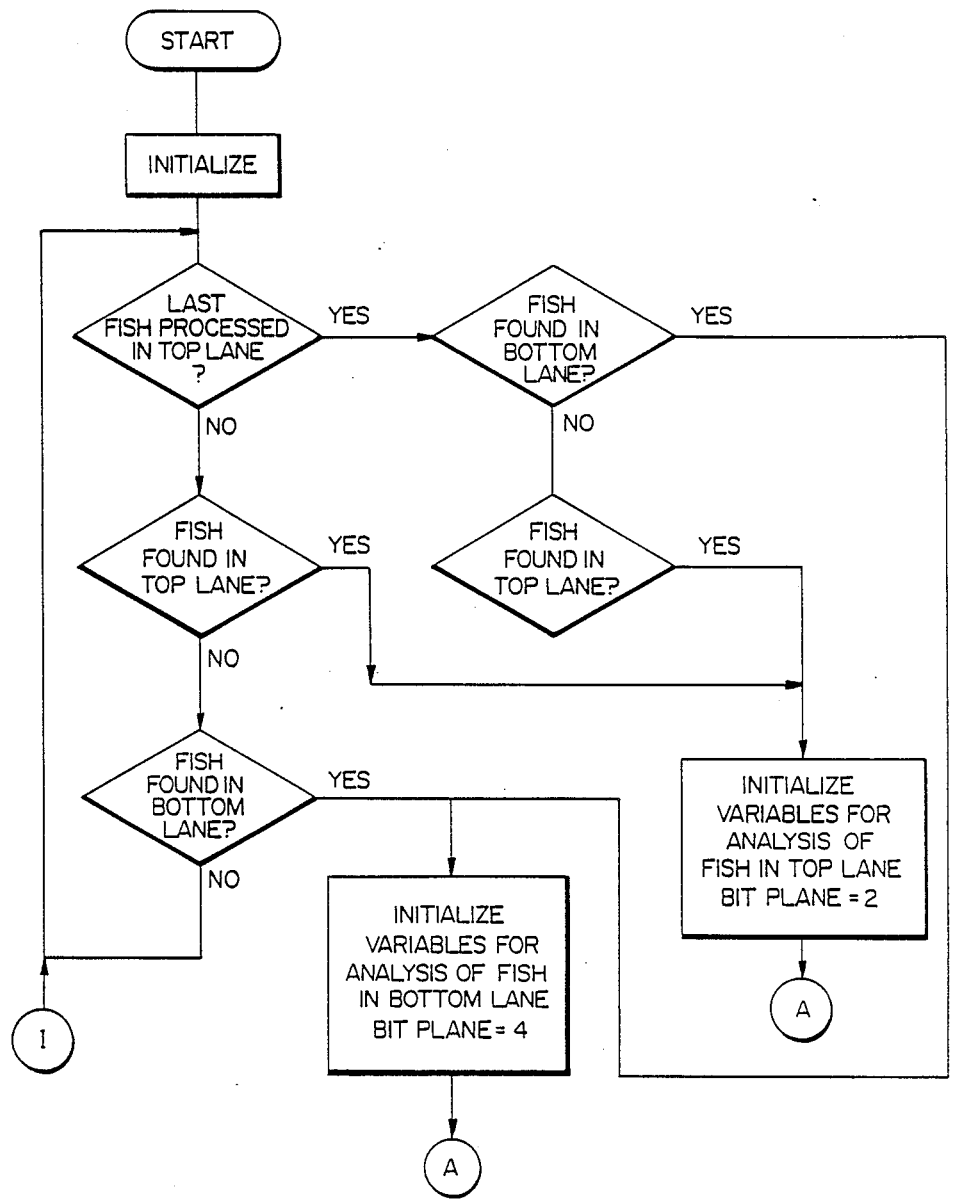
Figure 7B:
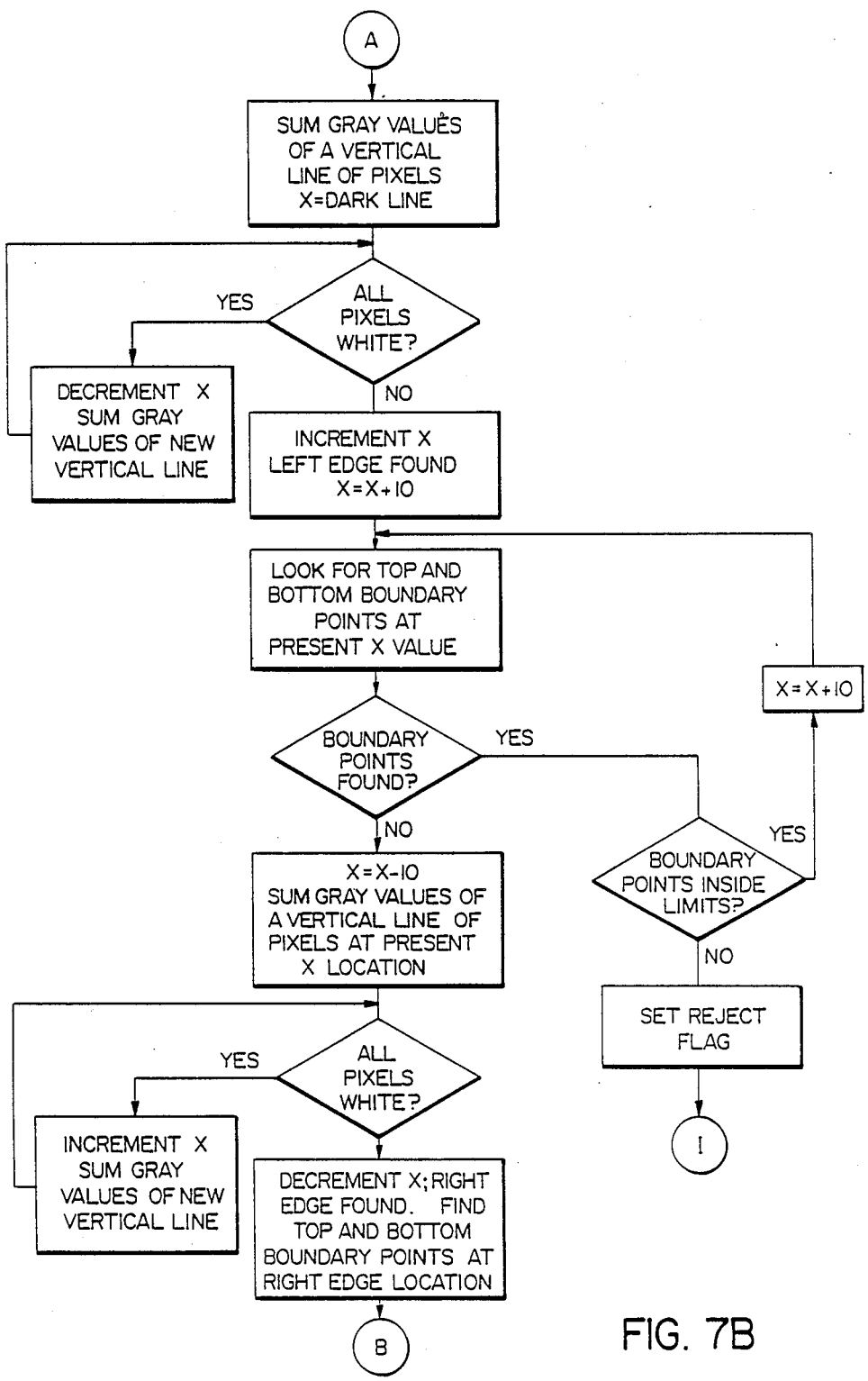
Figure 7C:
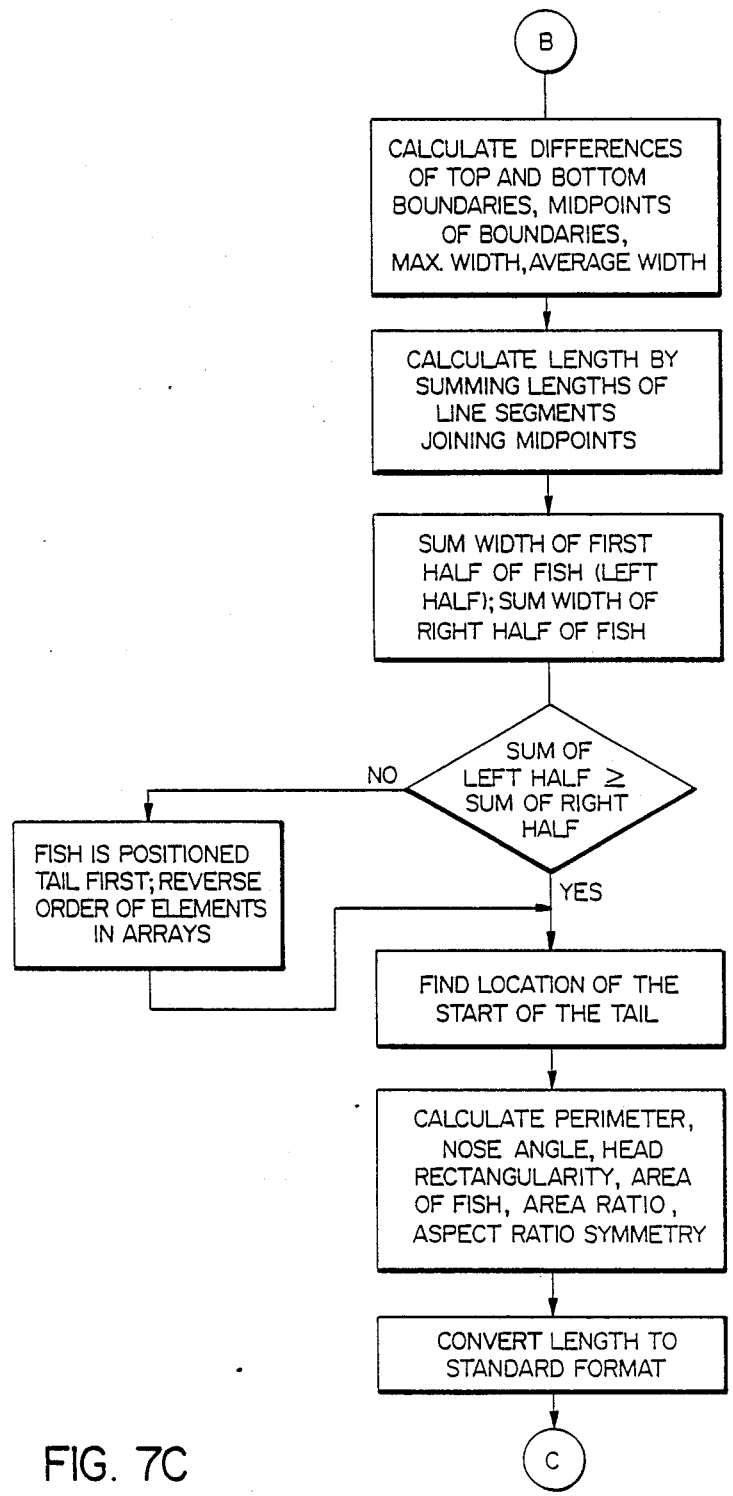
Figure 7D:
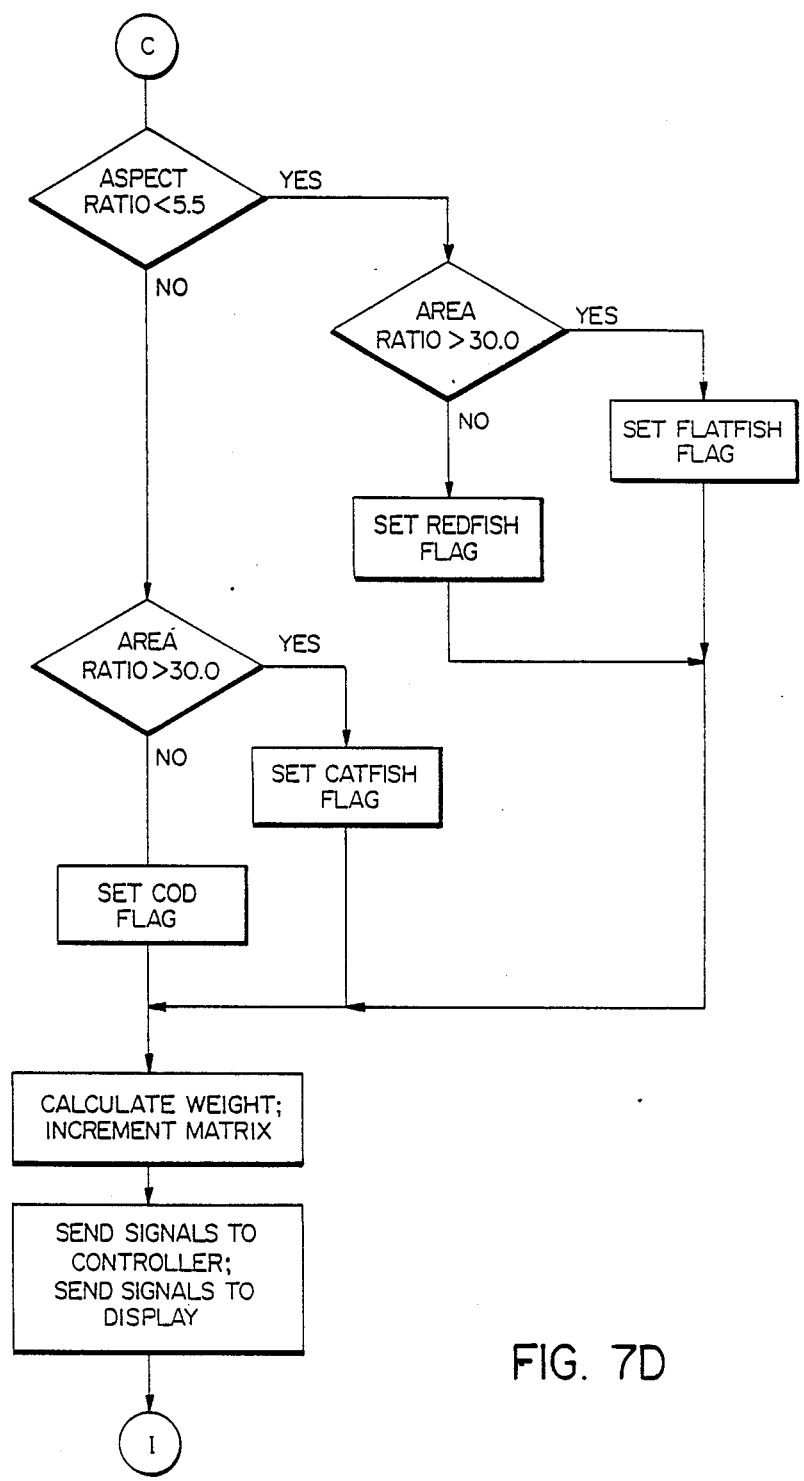
Figure 8A:
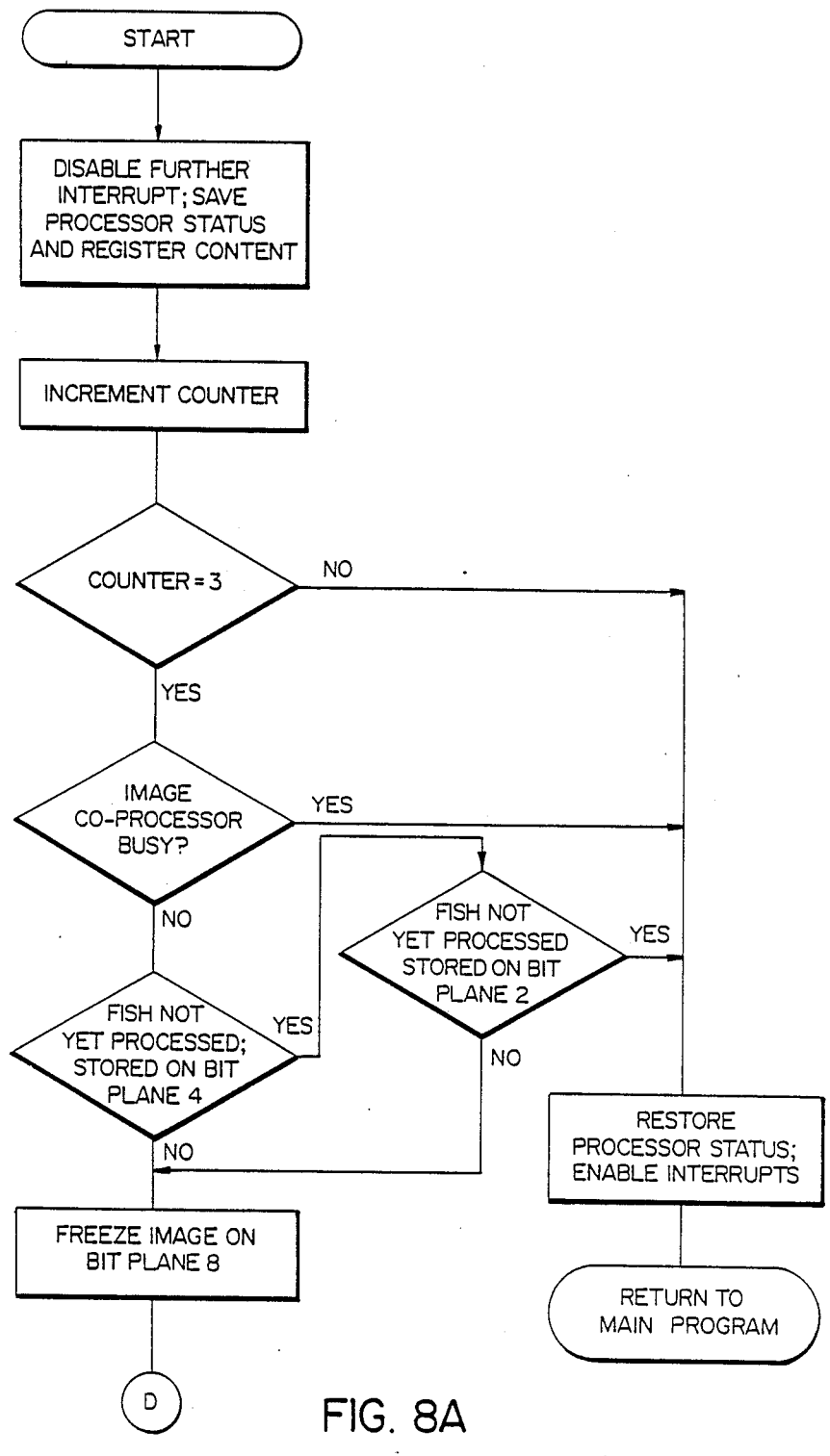
Figure 8B:
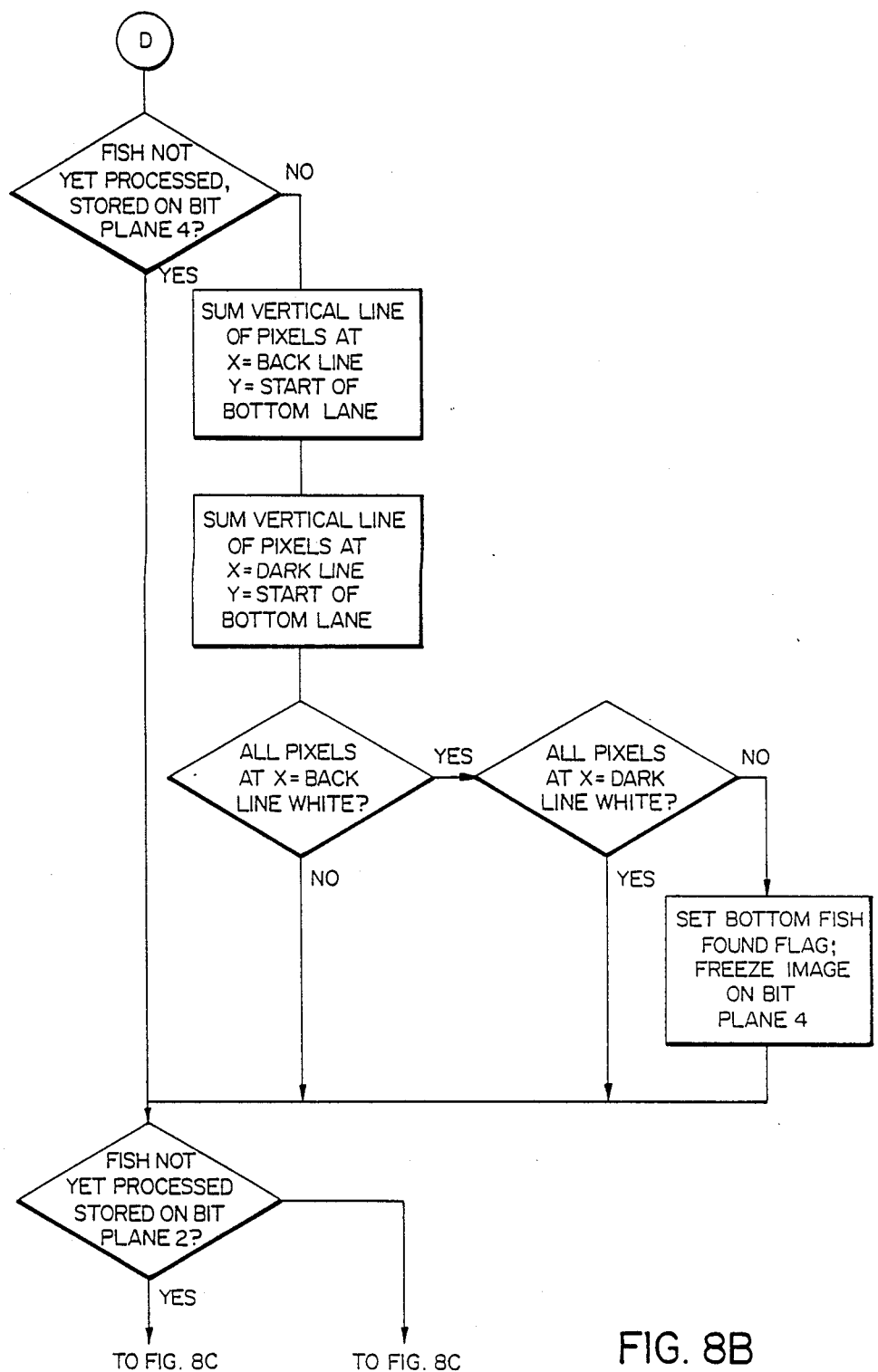
Figure 8C:
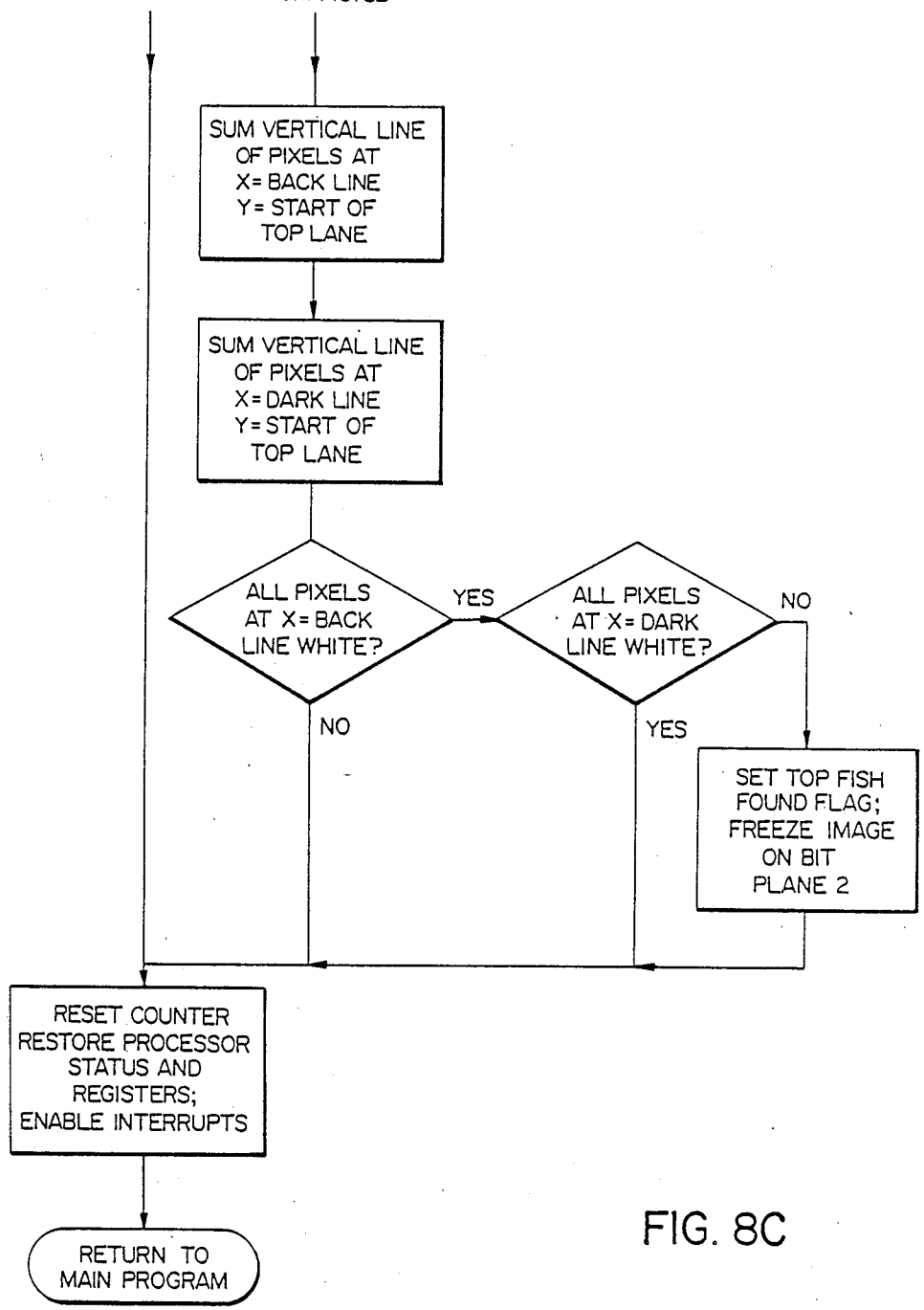

FIG. 4 is a schematic representation of a memory used in the processor of FIG. 3, FIG. 5 is a view of the bit plane used to illustrate how the dimensions of a fish are determined, FIG. 6 is a view of a bit plane illustrating how the true length of a fish is determined, FIGS. 7A-7D is a flow chart of an algorithm for determining the position of the fish represented on a memory bit plane connected to a video camera, and for determining the specie of the fish, and FIGS. 8A-8C represent a flow chart of an algorithm for determining the presence of a fish in the bit plane.

Figure 1:
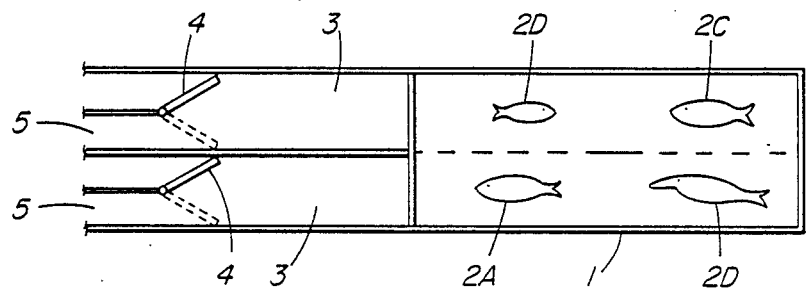
FIG. 1 is a plan view of a conveyor belt conveying two rows of fish.

FIG. 1 illustrates a conveyor 1, moving in the direction of the arrow, carrying four fish 2A-2D of two lines of fish in two rows separated by a dotted line along the axis of the arrow. At a position downstream of the fish and disposed across either a further conveyor or a chute 3 are preferably pneumatically controlled doors 4 which can take either the position shown or an alternate position depicted in phantom. When the doors are in the positions shown, whatever fish pass thereto along the chutes 3, are deflected into a lower sub-chutes 5, for further processing selectively relating to that sub-chute. As may be seen either one of the chutes has two associate sub-chutes, and each sub-chute can be further divided. Thus with the knowledge of what species, weight, or other characteristic is associated with the fish, a signal can be generated and with time delay sent to a controlling mechanism for one or both of the doors, to cause the fish to pass down one of the sub-chutes as desired. It can be seen in FIG. 1 that fish 2D is tail first. The present invention is able to handle the fish determination with the fish tail first in contrast to the prior art which required it to be head first.

Figure 2:
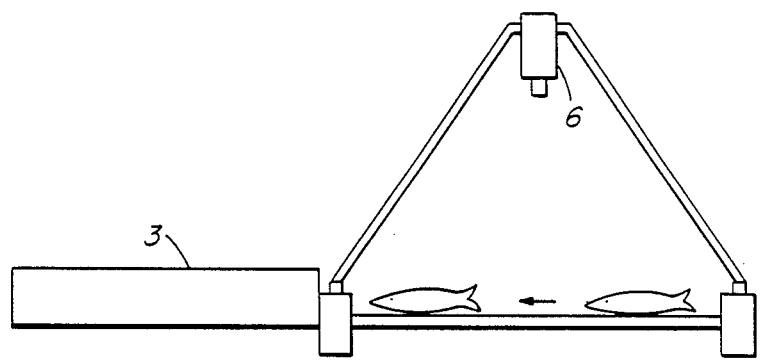
FIG. 2 is a front elevation of the view shown in FIG. 1.

FIG. 2 depicts the apparatus of FIG. 1 in a side elevation. In this figure a video camera 6 is diposed above the conveyor, by which a field of view spanning across both rows of fish is registered. It is preferred that video camera 6 should have a charge coupled device (CCD) light sensor. One camera which can be used in the present invention is made by Hitachi Corp., type KP120 CCD camera.

A block diagram of apparatus for carrying out the process of the present invention is shown in FIG. 3. Video camera 6 is connected to a video or image processor 7, which provides an output signal display and/or modem 8 and/or printer 8A, and controls signals to controller 9. The output signal of controller 9 is connected to chute door control apparatus, shown as chute solenoids 10. The chute solenoids are connected to the doors or to pneumatic controls for pneumatically operating doors 4. The image processor is preferred to be OCTEK 2000 Viking task, operated by a type 11/73 microcomputer of Digital Equipment Corporation.

The video camera in conjunction with processor 7 generates four bit words which are characteristic of each pixel containing grey tone in the CCD of the video camera 6. This signal is normally stored in a bit plane. For example the video memory of the system typically consists of $320\times240$ four bit words. This allows storage of one full image using sixteen grey levels. However in the present invention we consider the memory as consisting of four groups of $320\times240$ one bit words, contained in each of four bit planes. Thus four full binary images are stored therein. With a binary image, each pixel is either black or white, i.e. on or off. Thus only one bit, e.g. the most significant bit of each word is present on the first bit plane.

In the present invention the bit plane containing the most significant bit is utilized. The data to be stored in the other three bit planes is filtered or masked.

Considering FIG. 4, four bit planes are shown into which the image memory is typically divided. In the present invention, however, the most significant bit is stored in the top most bit plane 11. The other bit planes are used as will be described below.

The bit plane 11 is continuously scanned. As the image of a fish 12 progresses from right to left across the bit plane, it eventually crosses a line starting at the left of the bit plane at position $x=40$, $y=10$. This is sensed once the memory locations along that line change from 0 to 1 or vice versa, in the presence of a fish.

It should be noted that there are two lines of fish, separated by the imaginary dashed line 13. The processor divides the bit plane into two, on each side of line 13, and processes the bit plane image therein separately. Thus even if two fish pass the line 0,0 separately, the processor deals with that information individually.

With the indication of a fish having passed line 40,10 in the left hand row, which has not passed line 10,10 (which is close to the end of the bit plane), the image data from the left-hand row is transferred to the second bit plane 14. In the same manner when the presence of a fish 12A is present in the right-hand row which has passed line 40,10 but has not yet passed line 10,10 is detected, the bit plane image from that side of line 30 is transferred to the third bit plane 15.

Thus because the fish can overlap each other and indeed be located exactly coincident with each other in respect of a line orthogonal to the direction of travel, yet the time between fish along a line constituting a row is relatively long, the present invention can provide sufficient processing time to accommodate more than one row of fish by transferring the fish image from each of the rows to individual separate bit planes where they re stored for longer periods of time. In a similar manner, for example, three rows of fish can be accommodated, and the image of the third row transferred to the fourth bit plane 16, etc.

Once the images have been transferred to bit planes other than the first, the processor can deal with each in leisure. Further, the images can be transferred to a CRT display either automatically or selectively by an operator. The specie and/or other factors determined about each fish can be transferred to a remote computer by means of a modem 8 and printed on a printer 8A.

FIG. 5 illustrates the outline 17 of a grey image of a fish on one of the lower bit planes. The bit plane is digitally scanned, the lateral scan lines being depicted as $17_1$, $17_2$, $17_3$ . . . $17_{N-3}$, $17_{N-2}$, $17_{N-1}$, $17_N$. It can be seen that scanning lines $17_1$ and $17_N$ all encounter lines of white pixels, e.g. 0's. However immediately inward scan lines $17_2$ and $17_{N-1}$ depict lines in which black pixels (containing 1's) are encountered.

For the lines containing black pixels, the digital values at the minimum and maximum digital values of the black pixels are determined, and divided by 2. The pixel points representing half the distance between the two aforenoted minimum and maximum black pixels are depicted as center points $18_2$, $18_3$ . . . $18_{N-1}$, $18_{N-2}$, $18_{N-3}$ (the reference numeral subscripts of the center points where chosen to correspond with the corresponding subscript number for the scanning lines, for sake of consistency).

FIG. 6 depicts the fish image 17 with the scanning lines $17_{N-1}$ as in FIG. 5. In this case the fish image 17 is curved, corresponding to a curved fish. The center points $18_2$–$18_{N-1}$ are also shown.

Now the distances between the center points are all determined and summed. This sum represents the overall length of the fish, whether straight or curved. In contrast to this, prior art imaging systems would determine the head to tail distance represented by line 19. It can be seen that the length of the line 19 is substantially shorter than the length of the line representing the distances between the center points. The latter line, which follows the curvature of the fish, is clearly the more accurate representation.

The length of the fish having been determined, the half length point 18H is then determined, by determining the scan line which intersects the center point which is half the determined distance between the end point center points $18_2$ and $18_{N-1}$. The distance 20 represents the left half of the fish images and the distance 21 represents the right half of the fish image.

With the addresses of the first black pixels along each scan line representing the edges of the fish image already determined, the sum of the distances between them (i.e. representing the widths of the fish along those scan lines) is determined for both the left half of the fish and the right half of the fish, along the scan lines intersecting the lines 20 and 21 respectively. This corresponds to determining areas of the image surface. A comparison is then made. If the sum of the widths of the scan lines intersecting the fish image over the left half of the fish is equal to or greater than the sum of the scan line widths intersecting the image at the right half of the fish, then the fish is considered to be nose forward (to the left). However if the sum of the left half of the fish is not equal to or greater than the sum of the right half of the fish, then the fish is considered to be position tail forward. In order to determine the remainer of the values, the elements in all arrays relating to this tail forward fish image are merely reversed. Thus the requirement to physically turn the fish 180° nose to end as required in the prior art is not required in the present invention.

The aspect ratio (length/width), area ratio (area/length), tail ratio (width of tail/square root of length), head ratio (width of head/square root of length), nose angle and symmetry of the fish are determined from the image edge positions and calculated values In the event the aspect ratio is greater than 5.5 and the area ratio is smaller than 30.0, it is concluded that a codfish is present.

With the aspect ratio greater than 5.5 and the area ratio greater than 30.0, it is determined that a catfish is present.

In the event the aspect ratio is smaller than 5.5 and the area ratio is smaller than 30.0, it is determined that a redfish is present. In the event the aspect ratio is smaller than 5.5 and the area ratio is greater than 30.0, it is concluded that a flatfish is present.

With the determination of the aforenoted four species, flags are set appropriate to each of the species.

With the area being determined by summing the widths of each of the scan lines over the interval which intersect the dark pixels in the bit plane, the area is determined. With the area calculated and in the presence of a flag indicating the fish specie, a constant is applied appropriate to each specie and an assumed weight is calculated.

On the basis of the weight and/or specie, the processor 7 provides a signal to the controller 9 indicative of the designation of the fish resident on the particular bit plane being processed. The controller, with an appropriate time delay relating to the speed of the conveyor, generates a signal to chute solenoids 10 to control doors 4 and the ultimate destination of the fish.

The above description has followed the processing of the image along the general algorithm described in FIGS. 7A-7D respectively. The flow charts shown therein, which will be evident to a person skilled in the art and containing descriptions of the process, are an indication of the process in more detail. The flow charts constituting FIGS. 8A, 8B and 8C represent the interrupt routine for determining the presence of a fish on the first image plane and the determination of its dimensions on the second or third, as described more generally above.

Because considerable processing time is required to do the specie and weight determination and to allow for display on a monitor, while the determination of the presence of fish in the two lanes in the first bit plane can be done rapidly, the present invention has provided means for sharing a processor to perform the various tasks in a highly efficient manner, and to perform determination of fish characteristics not previously able to be provided. As noted earlier the determination of the presence of a fish is performed in association with the least significant bit in the bit image constituting a single bit plane, and once the presence of the fish image has been determined on either side of an imaginary line dividing the fish row paths, the entire image from either half is stored on corresponding separate bit planes. The processor can, after determining the presence of the image and transferring it to one of the other bit planes, perform the specie determination calculations with more available time, while being interrupted from time to time to check for the presence of a fish in the first bit plane.

Further, the present invention determines the length of the fish, including curved fish, to a much more accurate degree than previously possible. This is performed by calculating the midpoint of the scanning lines over the image of the fish, then summing the distances between the midpoints.

With the availability of the midpoint values, the center of the fish coordinates are determined, and the areas of the fish to the left and right determined. This provides an indication of whether the fish is tail or head first.

With the summation of the scan line distances over the fish image, the area is determined, and from that a specie calculation as described in the body of this specification, and an estimated weight of the fish can be determined. With an appropriate resulting signal being sent to a chute solenoid controller, the fish can be sorted to an accurate degree and with characteristic sub-divisions not previously possible.

A person skilled in the art understanding this invention may now conceive of alternate embodiments or other designs using the principles described herein. All are considered to be within the sphere and scope of this invention as defined in the claims appended hereto.

We claim:

1. Means for sorting fish comprising:
   (a) means for receiving an image of a fish in a video camera,
   (b) means for receiving the image from the camera and for storing it in an image plane memory,
   (c) means for determining stored values of the width of the fish along lines perpendicular to the principal axis of the fish, and stored values of the position of the first and last one of said lines along said principal axis which intersect said image,
   (d) means for determining the positions of midpoints between determined width boundary values, and for determining a length of lines joining said midpoints,
   (e) means for summing the length of said lines to determine the length of the fish.

2. Means for sorting fish as defined in claim 1, further comprising:
   (f) means for determining the midpoint of the length of the fish, and
   (g) means for summing the values between said determined width values to the left of the midpoint of the length of the fish to obtain a first half length area, and for summing the values between said determined width values to the right of the midpoint of the length of the fish to obtain a second half length area, and
   (h) means for indicating that the fish is positioned tail first if the first half length area is less than or equal to the second half length area.

3. Fish sorting means as defined in claim 2, including means for determining the aspect ratio (length/width), the area ratio (area/length), tail ratio (width of tail/square root of length) and head ratio (width of head/square root of length), means for comparing at least the aspect and area ratios with predetermined corresponding ratios, and means for providing an indicating signal corresponding to a determined fish species therefrom.

4. Means for sorting fish comprising:
(a) a conveyor belt for carrying more than one row of fish along row axes parallel to the axis of the conveyor belt,
(b) means for illuminating the fish,
(c) a video camera spaced from the fish for receiving at least outline images of the fish carried along the belt,
(d) a video memory having at least 3 bit planes connected to the video camera,
(e) means for storing an image of a fish in a first row received from the video camera in a first bit plane of the video memory,
(f) means for determining the presence of the image and for transferring the image of the fish to a second bit plane of the video memory,
(g) means for determining the size and orientation of the fish from stored edge values of the image in the second bit plane,
(h) means for storing the image of another fish in another row received from the video camera in the first bit plane of the video memory,
(i) means for determining the size and orientation of the other fish from the stored edge values of the image of the other fish in the first bit plane,
(j) means for transferring the image of the other fish to a third bit plane,
whereby the same video memory can be used for characteristic analysis of fish carried by the conveyor belt and display by the video monitor of more than one row of said fish.

5. Means for sorting fish as defined in claim 4 further comprising:
(a) means for determining boundary values of said image in the second bit plane,
(b) means for determining predetermined areas of said image,
(c) means for determining ratios of predetermined ones of said areas, and
(d) means for indicating the species of the fish from predetermined ratios of said areas.

6. Means for sorting fish as defined in claim 4, further comprising:
(a) means for determining stored boundary values of the width of the fish along lines perpendicular to the principal axis of the fish, and stored values of the position of the fish and first and last one of said lines along said principal axis which intersect said image,
(b) means for determining positions of a midpoints between said determined width boundary values, and for determining the length of lines joining said midpoints, and
(c) means for summing the length of said lines to determine the length of the fish.

7. Means for sorting fish as defined in claim 6, further comprising:
(a) means for determining the midpoint of the length of the fish,
(b) means for summing the values between said determined width values to the left of the midpoint to obtain a first half length area, and for summing the values between said determined width values to the right of the midpoint of the length of the fish to obtain a second half length area, and
(c) means for indicating that the fish is positioned tail first if the first half length area is less than or equal to the second half length area.

8. Means for sorting fish as defined in claim 7, further comprising means for determining an aspect ratio (length/width), an area ratio (area/length), tail ratio (width of tail/square root of length), and head ratio (width of head/square root of length), means for comparing at least the aspect and area ratios with predetermined corresponding ratios, and means for providing an indicating signal corresponding to a determined fish species.

9. A method for sorting fish comprising:
(a) establishing digital values of bit plane pixel positions at edges of an image of a fish stored on a bit plane, along straight lines across the fish,
(b) determining midpoints between said values,
(c) summing the distances between said midpoints, to obtain a digital value signal representative of a length of the fish,
(d) determining the midpoint of said summed distance,
(e) establishing the sum of the distance between said bit plane pixel positions at the edge of the image to the left of the midpoint of said summed distances between said midpoint to obtain a left area signal,
(f) establishing the sum of the distance between said bit plane pixel positions at the edge of the image to the right of the midpoint of said summed distances between said midpoints to obtain a right area signal, and
(g) comparing the left area signal with the right area signal and providing a signal indicative of the fish being positioned tail to the left in the event the left area signal is equal to or smaller than the right area signal.

10. A method as defined in claim 9 including the steps of determining from said bit plane pixel positions and digital value representative of the length of the fish an aspect ratio (length/width), an area ratio (area/length), a tail ratio (width of tail/square root of the length) and head ratio (width of the head/square root of the length), comparing at least the aspect and area ratios with predetermined ratios, and providing a signal indicating one or more predetermined specie of fish therefrom.

11. A method as defined in claim 9 including the steps of determining from said bit plane pixel positions and digital value representative of the length of the fish, an aspect ratio (length/width), an area ratio (area/length), a tail ratio (width of tail/square root of the length) and head ratio (width of the head/square root of the length), comparing at least the aspect and area ratios with predetermined ratios, and indicating the presence of a cod fish if the aspect ratio is greater than about 5.5 and the area ratio is smaller than about 30.0.

12. A method as defined in claim 9 including the steps of determining from said bit plane pixel positions and digital value representative of the length of the fish, an aspect ratio (length/width), an area ratio (area/length), a tail ratio (width of tail/square root of the length) and head ratio (width of the head/square root of the length), comparing at least the aspect and area ratios with predetermined ratios, and indicating the presence of a catfish if the aspect ratio is greater than about 5.5 and the area ratio is greater than about 30.0.

13. A method as defined in claim 9 including the steps of determining from said bit plane pixel positions and digital value representative of the length of the fish, an aspect ratio (length/width), an area ratio (area/length), a tail ratio (width of tail/square root of the length) and head ratio (width of the head/square root of the length), comparing at least the aspect and area ratios with predetermined ratios, and indicating the presence of a redfish if the aspect ratio is smaller than about 5.5 and the area ratio is smaller than about 30.0.

14. A method as defined in claim 9 including the steps of determining from said bit plane pixel positions and digital value representative of the length of the fish, an aspect ratio (length/width), an area ratio (area/length), a tail ratio (width of tail/square root of the length) and head ratio (width of the head/square root of the length), comparing at least the aspect and area ratios with predetermined ratios, and indicating the presence of a flatfish if the aspect ratio is smaller than about 5.5 and the area ratio is greater than about 30.0.

15. A method for sorting fish, including the steps of:
    (a) receiving on a first bit plane of a digital memory the most significant bit values of an image of a fish as it is viewed in a video camera,
    (b) repeatedly checking a position of said image on the first bit plane,
    (c) transferring the image to a second bit plane for analysis of its dimensions when the progressing front of the image passes a predetermined line of pixels orthogonal to a direction of progress of the image, which are in within a predetermined distance from an edge of the first bit plane.

16. A method for storing fish as defined in claim 15, further including:
    (a) establishing the digital values of a second bit plane pixel positions at the edge of the image of a fish stored on a bit plane, along lines across the fish,
    (b) determining midpoints between said values, and
    (c) summing the distance between said midpoints, to obtain a digital value signal representative of the length of the fish.

17. A method as defined in claim 16, with the further steps of:
    (d) determining the midpoint of said summed distance,
    (e) establishing the sum of the distance between said bit plane pixel positions at the edge of the image to the left of the midpoint of said summed distances between said midpoint to obtain a left area signal,
    (f) establishing the sum of the distance between said bit plane pixel positions at the edge of the image to the right of the midpoint of said summed distances between said midpoints to obtain a right area signal,
    (g) comparing the left area signal with the right area signal and providing a signal indicative of the fish being positioned tail to the right in the event the left area signal is equal to or smaller than the right area signal.

18. A method as defined in claim 17 including the steps of determining from said bit plane pixel positions and digital value representative of the length of the fish an aspect ratio (length/width), an area ratio (area/length), a tail ratio (width of tail/square root of the length) and head ratio (width of the head/square root of the length), comparing at least the aspect and area ratios with predetermined ratios, and providing a signal indicating one or more predetermined specie of fish therefrom.

* * * * *